(12) United States Patent
Fan et al.

(10) Patent No.: US 11,255,758 B2
(45) Date of Patent: Feb. 22, 2022

(54) CLAMPING DEVICE AND MICROTOME HAVING SAME

(71) Applicant: LEICA MICROSYSTEMS LTD., SHANGHAI, Shanghai (CN)

(72) Inventors: Zheguang Fan, Shanghai (CN); Xiangyu Hao, Shanghai (CN); Xiaoqi Jiang, Shanghai (CN)

(73) Assignee: Leica Microsystems Ltd., Shanghai, Shanghai (CN)

( * ) Notice: Subject to any disclaimer, the term of this patent is extended or adjusted under 35 U.S.C. 154(b) by 141 days.

(21) Appl. No.: 16/609,479

(22) PCT Filed: Apr. 11, 2018

(86) PCT No.: PCT/CN2018/082592
§ 371 (c)(1),
(2) Date: Oct. 30, 2019

(87) PCT Pub. No.: WO2018/201865
PCT Pub. Date: Nov. 8, 2018

(65) Prior Publication Data
US 2020/0200650 A1 Jun. 25, 2020

(30) Foreign Application Priority Data

May 3, 2017 (CN) .......................... 2017103063222

(51) Int. Cl.
*G01N 1/06* (2006.01)
*G01N 1/28* (2006.01)

(52) U.S. Cl.
CPC .................. *G01N 1/06* (2013.01); *G01N 1/28* (2013.01)

(58) Field of Classification Search
CPC combination set(s) only.
See application file for complete search history.

(56) References Cited

U.S. PATENT DOCUMENTS 4,620,695 A * 11/1986 Vanistendael ............. B25B 5/16
269/24
4,695,046 A * 9/1987 Berleth ..................... G01N 1/06
269/210

(Continued)

FOREIGN PATENT DOCUMENTS

CN  103481077 A  * 1/2014
CN  203401319 U  * 1/2014
CN  106239608 A  * 12/2016

OTHER PUBLICATIONS

KWIKSET entry, inside, outside door Knob / Lever set—right hand. (Aug. 24, 2002). Retrieved Apr. 29, 2021, from https://www.ebay.com/itm/KWIKSET-Entry-Inside-Outside-Door-Knob-Lever-Set-Right-Hand-/254698566004 (Year: 2020).*

*Primary Examiner* — Samuel P Siefke
*Assistant Examiner* — Tingchen Shi
(74) *Attorney, Agent, or Firm* — Hodgson Russ LLP

(57) ABSTRACT

A clamping device includes: an operating member; a wedge having a first inclined surface; a clamping member having a second inclined surface movable relative to the first inclined surface, the first and second inclined surfaces being provided in a face-to-face arrangement; and a housing having a first guiding part, a second guiding part and a chamber. The operating member is mounted in the first guiding part, the clamping member is mounted in the second guiding part, and the wedge is disposed in the chamber; the operating member is operated to move towards the wedge, such that the operating member contacts and pushes the wedge to move, and further the first inclined surface contacts and moves along the second inclined surface; whereby a pushing force of the operating member in a first direction is converted into a clamping force of the clamping member in a second direction.

19 Claims, 5 Drawing Sheets

(56) References Cited

U.S. PATENT DOCUMENTS

2009/0014934 A1* 1/2009 Seber .................. B25B 1/125
269/207
2011/0277608 A1* 11/2011 Meznaric ............ B26D 7/2628
83/331

* cited by examiner

CLAMPING DEVICE AND MICROTOME HAVING SAME

CROSS-REFERENCE TO RELATED APPLICATIONS

The present application is a national phase entry under 35 USC § 371 of International Application PCT/CN2018/082592, filed Apr. 11, 2018, which claims the benefit of and priority to Chinese Patent Application No. 201710306322.2, filed May 3, 2017, the entire disclosure of which is incorporated herein by reference.

FIELD

The present disclosure relates to a field of microtome, more particularly to a clamping device and a microtome having the same.

BACKGROUND

A microtome is used to remove sections from a sample. These sections are subsequently placed on a coverslip, treated suitably, and then checked under a microscope. In the microtome device, there are various requirements for clamping, such as clamping the blade, the knife holder, and so on.

A clamping mechanism for a cutter of a microtome is described in a U.S. Pat. No. 4,690,023, which has a wedge-shaped jaw and an eccentric bolt. By an appropriate rotation of the eccentric bolt, the wedge-shaped jaw may press the blade, or release the blade. When a user needs to clamp an object, rotate the eccentric bolt; when the user need to release the object, rotate the eccentric bolt in the opposite direction. In order to obtain better clamping function, the user needs to provide a great force to clamp. Furthermore, the user needs to perform clamping up to hundreds of times a day. Therefore, it is quite hard for the user. In addition, wear will be produced between the eccentric bolt and a portion for clamping in contact with the eccentric bolt, when the wear reaches a certain level after a certain period of time, the system will lose its clamping function.

SUMMARY

Embodiments of the present disclosure seek to solve at least one of the problems existing in the related art to at least some extent. Thus, one objective of the present disclosure is to provide a clamping device for a microtome, which has effortless operation, good self-locking performance and long service life.

Another objective of the present disclosure is to provide a microtome having the above clamping device.

The clamping device according to embodiments of a first aspect of the present disclosure includes: an operating member; a wedge having a first end, a second end and a first inclined surface located between the first end and the second end, the wedge being in the form of an expanded shape from the second end to the first end; a clamping member having a second inclined surface, the first inclined surface and the second inclined surface being provided in a face-to-face arrangement and the first inclined surface being movable relative to the second inclined surface; and a housing having a first guiding part, a second guiding part and a chamber, the first guiding part and the second guiding part being in communication with the chamber respectively, wherein the operating member is mounted in the first guiding part and the movement of the operating member is restricted to a first direction, the clamping member is mounted in the second guiding part and the movement of the clamping member is restricted to a second direction intersecting the first direction, and the wedge is disposed in the chamber; wherein the operating member is operated to move towards the wedge in a first direction, such that the operating member contacts the first end of the wedge and push the wedge to move, and further the first inclined surface of the wedge contacts the second inclined surface of the clamping member and moves along the second inclined surface; whereby a pushing force of the operating member in the first direction is converted into a clamping force of the clamping member in the second direction.

For the clamping device according to embodiments of the present disclosure, the force applied to the operating member is transmitted to the clamping member to realize the clamping through engaged inclined surfaces of the wedge and the clamping member. Furthermore, since a wedge structure has self-locking function, the clamping device according to embodiments of the present disclosure in a clamping state has self-locking performance.

Additionally, the clamping device according to above embodiment of the present disclosure may further include the following additional technical features.

In some embodiments of the present disclosure, the operating member includes a screw part with thread, the first guiding part is configured as a threaded hole extending in the first direction, and the screw part may be threaded into the threaded hole. Since a threaded structure has self-locking function, the self-locking performance of the clamping device according to embodiments of the present disclosure in the clamping state is further improved.

In some embodiments of the present disclosure, the operating member includes a lever part angularly and fixedly connected to an end of the screw part.

In some embodiments of the present disclosure, the lever part and the operating member are integrally formed, and the lever part is perpendicular to an axis of the screw part.

For the clamping device according to embodiments of the present disclosure, by providing the lever part, the clamping device is convenient and effortless to operate.

In some embodiments of the present disclosure, a portion of the screw part adjacent to the first end of the wedge forms a spherical surface. The portion of the screw part adjacent to the first end of the wedge is designed to be a spherical surface, such that a contacting area between the two is reduced, and further the wear is reduced, the service life of the clamping device is extended.

In some embodiments of the present disclosure, the clamping device further includes a first elastic element disposed between the second end of the wedge and a portion of the housing away from the first guiding part.

In some embodiments of the present disclosure, the first elastic element is a spring.

For the clamping device according to embodiments of the present disclosure, by providing the first elastic element, the first elastic element overcomes the self-locking of the wedge structure under the elastic restoring force, such that the release of a clamping object becomes easy.

In some embodiments of the present disclosure, the chamber is configured as a cylindrical shape disposed in the first direction.

In some embodiments of the present disclosure, the wedge is configured as a truncated eccentric cone, and the first inclined surface of the wedge is configured as an inclined curved surface disposed facing downward in the second direction.

In some embodiments of the present disclosure, the clamping member is configured as a T-shaped pin, the T-shaped pin has a groove adapted to receive the wedge, and the second inclined surface of the clamping member is configured as a inclined curved surface of the groove disposed facing upward in the second direction; the second guiding part is configured as a circular hole and a circular groove extending and coaxially disposed in the second direction.

In some embodiments of the present disclosure, the circular hole is disposed in an upper portion of the housing in the second direction, and the circular groove is disposed in a lower portion of the housing in the second direction.

For the clamping device according to embodiments of the present disclosure, the wedge clamps the clamping object by pulling the clamping member in the process of the clamping, such that the clamping device according to embodiments of the present disclosure is configured as a pull-type clamping device.

In some embodiments of the present disclosure, the clamping device further includes a second elastic element disposed between a lower end of the T-shaped pin and the lower portion of the housing.

In some embodiments of the present disclosure, the second elastic element is a spring.

For the clamping device according to embodiments of the present disclosure, the inclined surfaces of the T-shaped pin and the wedge are engaged all the time, and the wedge is engaged with an inner surface of the chamber of the housing all the time, such that the T-shaped pin is prevented from impacting on the wedge extending into the groove of the T-shaped pin under the action of the weight of the T-shaped pin.

In some embodiments of the present disclosure, the wedge is configured as a chamfer cylinder, and the first inclined surface of the wedge is configured as an inclined plane disposed facing upward in the second direction.

In some embodiments of the present disclosure, the clamping member is configured as a cylindrical pin, and the second inclined surface of the clamping member is configured as an inclined plane formed on a lower end of the cylindrical pin and disposed facing downward in the second direction; the second guiding part is configured as a circular hole extending in the second direction.

In some embodiments of the present disclosure, the circular hole is disposed in an upper portion of the housing in the second direction.

For the clamping device according to embodiments of the present disclosure, the wedge clamps the clamping object by pushing the clamping member in the process of the clamping, such that the clamping device according to embodiments of the present disclosure is configured as a push-type clamping device.

In some embodiments of the present disclosure, an upper end of the cylindrical pin forms a spherical surface. The upper end of the cylindrical pin is designed to be a spherical surface, such that a contacting area between the upper end of the cylindrical pin and the clamping object is reduced, and further the wear is reduced, the service life of the clamping device is extended.

The microtome according to embodiments of a second aspect of the present disclosure includes a clamping device according to embodiments of the first aspect of the present disclosure.

For the microtome according to embodiments of the present disclosure, by providing the wedge structure, the threaded structure, the lever structure, and so on, it has advantages of effortless operation, good self-locking performance and long service life.

Figure 1:
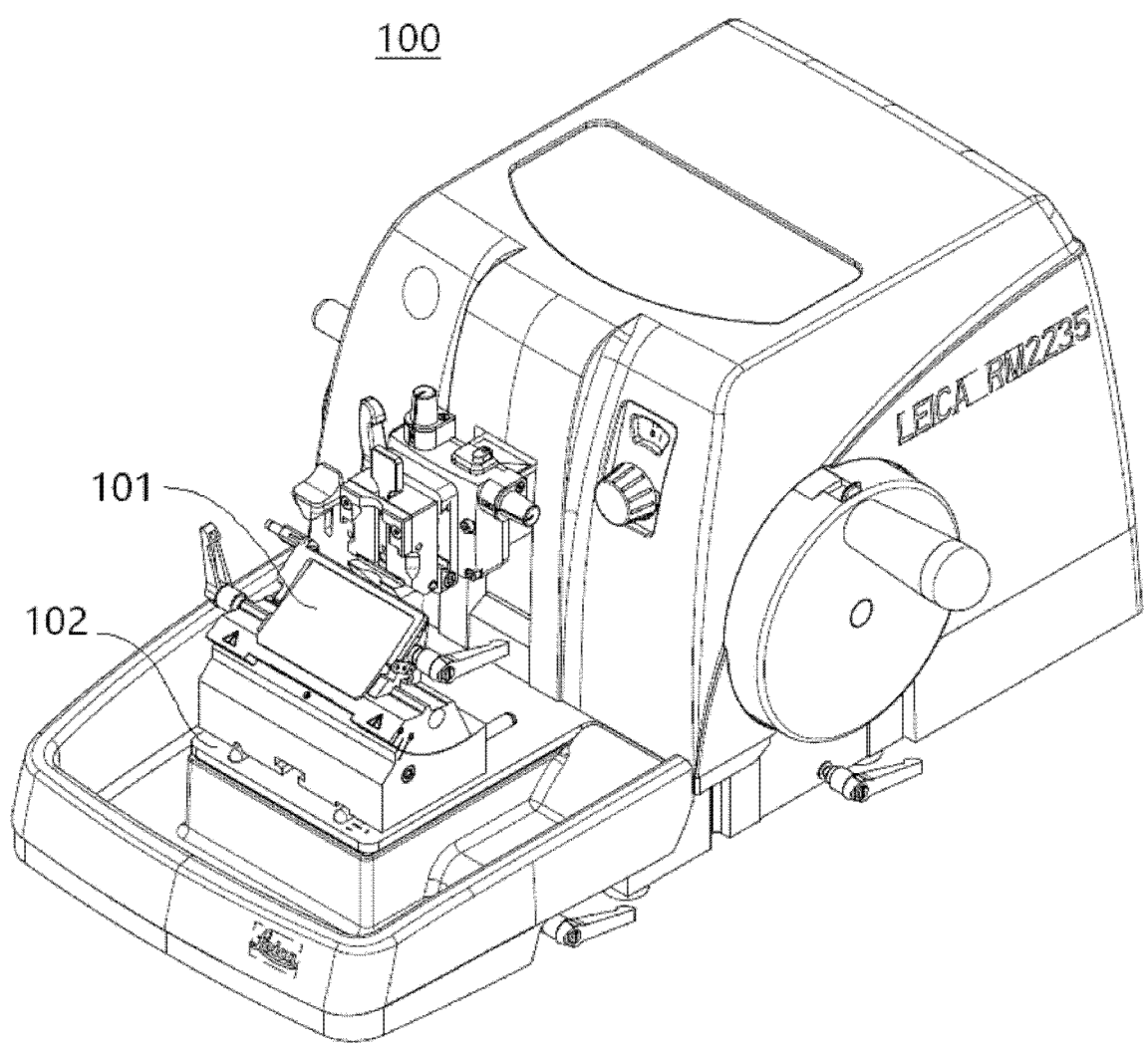
FIG. 1 shows a microtome existing in the prior art.

REFERENCE NUMERALS 100 microtome
101 knife holder
102 mounting seat
1 base
2 microtome blade
3 body
4 pressure plate
5 segmental curved member
6 shaft
7 connecting part
10 clamping devices
11 screw clamping lever
111 screw part
1111 left end
1112 right end
112 lever part
12 wedge
121 left end surface
122 curved surface
123 right end surface
124 horizontal curved surface
13 T-shaped pin
131 base part
132 protrusion part
133 groove
1331 lower wall surface
14 housing
141 threaded hole
142 circular hole
143 circular groove
144 chamber
15 first spring
16 second spring
17 clamping object
171 receiving groove
20 clamping devices
21 screw clamping lever
211 screw part
2111 left end
2112 right end
212 lever part
22 wedge
221 left end surface 222 inclined plane
223 right end surface
224 a cylindrical surface
23 cylindrical pin
231 lower end
232 upper end
24 housing
241 threaded hole
242 circular hole
243 chamber
25 spring
27 clamping object

DETAILED DESCRIPTION

The preferred embodiments of the present disclosure will be illustrated below with reference to the accompanying drawings. It should be noted that, as used herein, the terms such as "upper", "lower", "left", "right", "front", "rear" and the like are only for the purpose of illustration and are not intended to limit the present disclosure.

FIG. 1 shows a microtome 100 existing in the prior art. As shown in FIG. 1, the microtome 100 includes a knife holder 101 and a mounting seat 102. In which the knife holder 101 is connected to the mounting seat 102.

Figure 2:
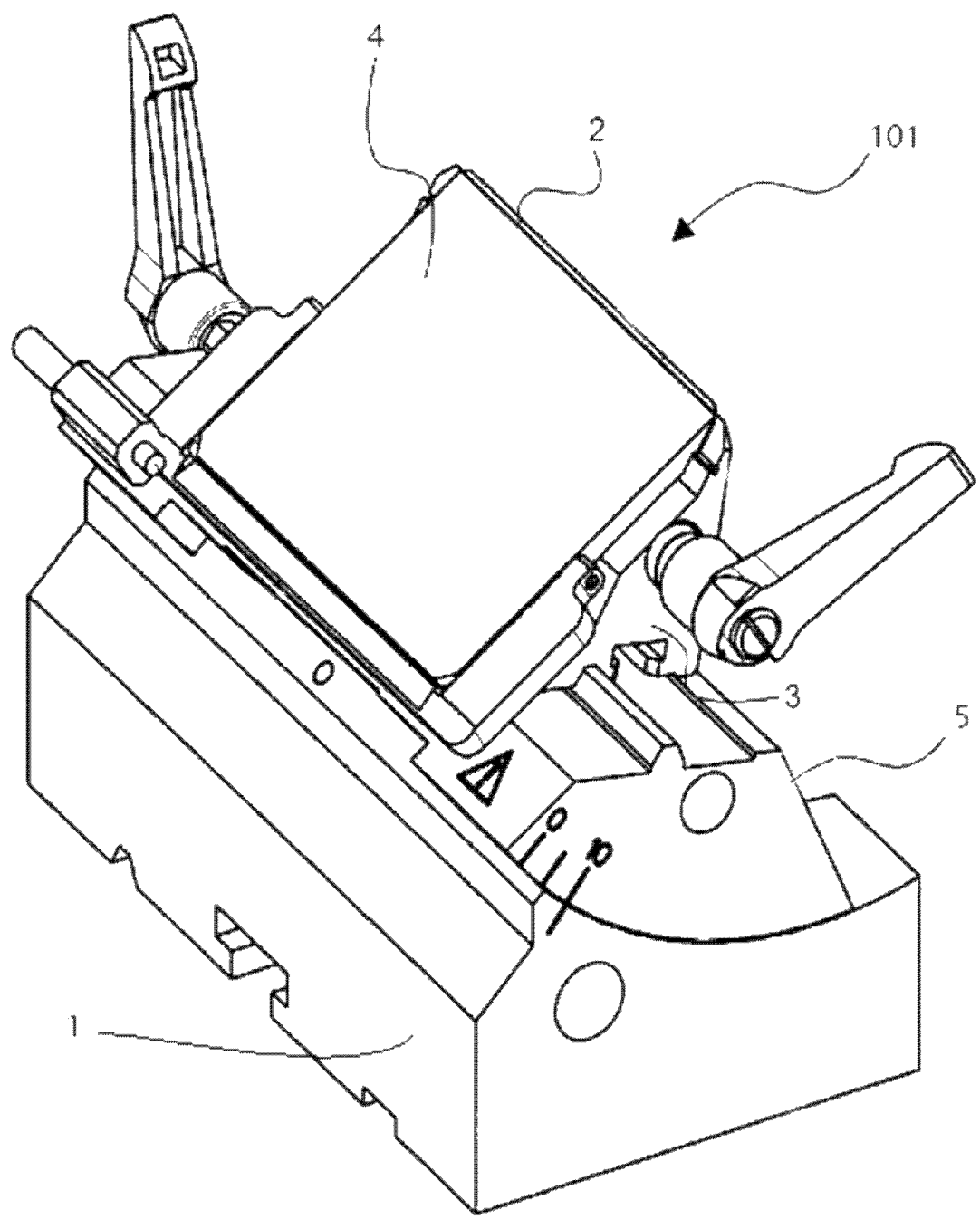
FIG. 2 shows a knife holder of the microtome in FIG. 1.

FIG. 2 shows the knife holder 101 of the microtome 100 in FIG. 1. As shown in FIG. 2, the knife holder 101 includes a base 1, a microtome blade 2, a body 3, a pressure plate 4, and a segmental curved member 5. In which the body 3 has an abutment surface, the pressure plate 4 is connected to the body 3, the pressure plate 4 is adjustable relative to the body 3 for clamping the microtome blade 2 received against the abutment surface, and the body 3 is laterally displaceable along the segmental curved member 5. In addition, the segmental curved member 5 is mounted on the base 1. After the orientation of the microtome blade 2 relative to the sample to be sliced has been adjusted, the microtome blade 2, the body 3 and the whole knife holder 101, etc. need to be clamped, such that the sample may be sliced.

FIGS. 3 to 7 show clamping devices 10, 20 according to embodiments of the present disclosure, which are used for the microtome. In FIG. 3 to 7, the orthogonal XYZ-axis is illustrated in order to facilitate the description and determine the directions. In which, the positive direction of the X-axis is the right direction and the negative direction of the X-axis is the left direction (as an example of the first direction); the positive direction of the Y-axis is the front direction and the negative direction of the Y-axis is the rear direction; the positive direction of the Z-axis is the up direction and the negative direction of the Z-axis down direction (as an example of the second direction).

The clamping devices 10, 20 for the microtome according to embodiments of the present disclosure have advantages of effortless operation, good self-locking performance and long service life.

The clamping device 10 for the microtome according to the embodiment of the present disclosure will be described below with reference to the accompanying drawings.

Figure 3:
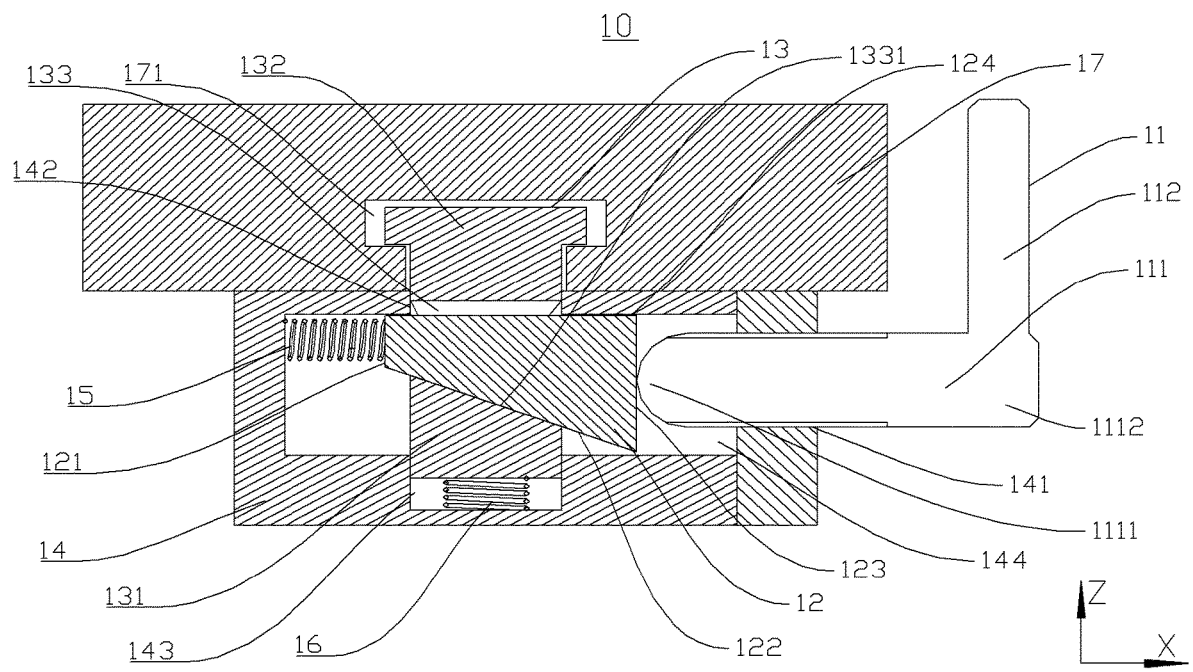
FIG. 3 shows a sectional view of a clamping device according to an embodiment of the present disclosure.
Figure 4:
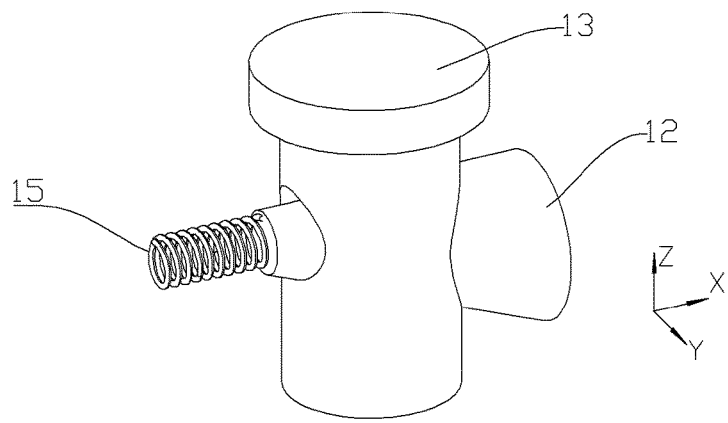
FIG. 4 shows a perspective view of a wedge, a T-shaped pin and a first spring of a clamping device according to an embodiment of the present disclosure.

As shown in FIGS. 3 and 4, the clamping device 10 for the microtome according to the embodiment of the present disclosure includes a screw clamping lever 11 (as an example of the operating member), a wedge 12, a T-shaped pin 13 (as an example of the clamping member) and a housing 14.

In the present embodiment, the screw clamping lever 11 includes a screw part 111 and a lever part 112. In which, the screw part 111 is configured as a cylinder shape extending in the left-and-right direction, and a thread is formed on an outer circumference thereof. The lever part 112 is configured as a rod shape, and the lever part 112 is integrally formed on a right end 1112 of the screw part 111 and is perpendicular to an axis of the screw part 111. Is should be understood that the lever part 112 may be fixedly connected to the screw part 111 through other structures and may be at other angles with the axis of the screw part 111. Accordingly, the provision of the lever part 112 of the screw clamping lever 11 may make the operation of the clamping device 10 effortless.

In the present embodiment, the wedge 12 is configured as a truncated eccentric cone, the wedge 12 includes a left end surface 121 and a right end surface 123 parallel to each other, an inclined curved surface 122 and a horizontal curved surface 124. In which, the inclined curved surface 122 is tilted in the left-and-right direction, and the horizontal curved surface 124 are horizontal in the left-and-right direction. That is to say, the inclined curved surface 122 of the wedge 12 is titled relative to the horizontal curved surface 124 of the wedge 12, and the inclined curved surface 122 of the wedge 12 is tilted upward gradually from the right to the left relative to the horizontal curved surface 124. The left end surface 121 and the right end surface 123 parallel to each other are each perpendicular to the horizontal curved surface 124 of the wedge 12, and a height of the left end surface in the up-and-down direction is less than that of the right end surface 123, i.e. a circle diameter of the left end surface 121 is less than that of the right end surface 123.

In the present embodiment, the T-shaped pin 13 includes a base part 131 and a protrusion part 132. The base part 131 of the T-shaped pin 13 is a cylindrical shape extending in the up-and-down direction, the protrusion part 132 of the T-shaped pin 13 is a cylindrical shape extending in the up-and-down direction, and the protrusion part 132 of the T-shaped pin 13 is connected to an upper end of the base part 131 of the T-shaped pin 13 and is disposed coaxially with the base part 131 of the T-shaped pin 13. The protrusion part 132 of the T-shaped pin 13 protrudes from the base part 131 of the T-shaped pin 13 in a radial direction, that is, a diameter of the protrusion part 132 of the T-shaped pin 13 is greater than that of the base part 131 of the T-shaped pin 13.

In addition, a groove 133 is formed in a substantial center of the base part 131 of the T-shaped pin 13 in the up-and-down direction, the groove 133 of the T-shaped pin 13 penetrates both sides of the base part 131 of the T-shaped pin 13 in the left-and-right direction and is configured to be adapted to receive the wedge 12, that is, an inner wall surface of the groove 133 of the T-shaped pin 13 is configured as a part of an outer surface of an eccentric cone. Specially, an upper wall surface of the groove 133 of the T-shaped pin 13 is horizontal in the left-and-right direction, that is, the upper wall surface of the groove 133 of the T-shaped pin 13 is adapted to abut against the horizontal curved surface 124 of the wedge 12. A lower wall surface 1331 of the groove 133 of the T-shaped pin 13 is configured as a inclined curved surface, in which a tilt angle of the lower wall surface 1331 of the groove 133 of the T-shaped pin 13 relative to the upper wall surface thereof is the same as that of the inclined curved surface 122 of the wedge 12 relative to the horizontal curved surface 124 of the wedge 12, and the lower wall surface 1331 of the groove 133 of the T-shaped pin 13 is also tilted upward gradually from the right to the left relative to the upper wall surface. It should be understood that the groove 133 of the T-shaped pin 13 is formed in a middle of the T-shaped pin 13 in the front-and-rear direction, but the present disclosure is not limited to this, the groove 133 of the T-shaped pin 13 may also be formed in a front or rear portion of the T-shaped pin 13 in the front-and-rear direction.

In the present embodiment, the housing 14 is used to accommodate the screw clamping lever 11, the wedge 12 and the T-shaped pin 13.

In the present embodiment, a threaded hole 141 extending in the left-and-right direction is formed in a right wall of the housing 14 and is adapted to mount the screw part 111 of the screw clamping lever 11. The screw clamping lever 11 is connected to the housing 14 through thread, when rotate the lever part 112 of the screw clamping lever 11 in a direction, the screw part 111 of the screw clamping lever 11 is screwed into the housing 14, when rotate the lever part 112 of the screw clamping lever 11 in the opposite direction, the screw part 111 of the screw clamping lever 11 is screwed out of the housing 14. Therefore, the movement of the screw part 111 of the screw clamping lever 11 is restricted to the left-and-right direction.

In the present embodiment, the housing 14 is configured to be a detachable structure, so as to facilitate the assembling and the maintenance of the clamping device 10. Preferably, the right wall of the housing 14 is configured to be the detachable structure, such that it may be replaced in time when the thread of the threaded hole 141 is damaged.

In the present embodiment, a chamber 144 extending in the left-and-right direction is formed in the housing 14, and the chamber 144 of the housing 14 is configured to be cylindrical and is used to accommodate the wedge 12. Specially, a diameter of the chamber 144 of the housing 14 is greater than or equal to the circle diameter of the right end surface 123 of the wedge 12, preferably, the diameter of the chamber 144 of the housing 14 is equal to the circle diameter of the right end surface 123 of the wedge 12, so as to facilitate reducing the movement of the wedge 12 in a radial direction. In addition, the chamber 144 of the housing 14 is in communication with the threaded hole 141 in the right wall of the housing 14, such that the screw part 111 of the screw clamping lever 11 enters the chamber 144 of the housing 14 when being screwed into the housing 14. It should be understood that the chamber 144 of the housing 14 may also be configured to be other shapes, such as a cuboid, but the present disclosure is not limited to this.

In the present embodiment, a circular hole 142 extending in the up-and-down direction is formed in an upper wall of the housing 14 and is adapted to receive the base part 131 of the T-shaped pin 13, specially, a diameter of the circular hole 142 in the upper wall of the housing 14 is greater than or equal to that of the base part 131 of the T-shaped pin 13. In the present embodiment, a circular groove 143 extending in the up-and-down direction is formed in a lower wall of the housing 14 and is adapted to receive the base part 131 of the T-shaped pin 13, specially, a diameter of the circular groove 143 in the lower wall of the housing 14 is greater than or equal to that of the base part 131 of the T-shaped pin 13. The circular hole 142 in the upper wall of the housing 14 and the circular groove 143 in the lower wall of the housing 14 are arranged coaxially, and the circular hole 142 in the upper wall of the housing 14 and the circular groove 143 in the lower wall of the housing 14 are in communication with the chamber 144 of the housing 14 respectively. Preferably, the projection of the axis of the circular hole 142 in the upper wall of the housing 14 and the circular groove 143 in the lower wall of the housing 14 on a horizontal plane (determined by the left-and-right direction and the front-and-rear direction together) coincides with the projection of the axis of the chamber 144 of the housing 14 on the horizontal plane. Thus, a lower end of the base part 131 of the T-shaped pin 13 may easily pass through the circular hole 142 in the upper wall of the housing 14 and the chamber 144 of the housing 14, and enter the circular groove 143 in the lower wall of the housing 14, such that the movement of the T-shaped pin 13 is restricted to the up-and-down direction. Preferably, diameters of the circular hole 142 in the upper wall of the housing 14 and the circular groove 143 in the lower wall of the housing 14 are equal to the diameter of the base part 131 of the T-shaped pin 13 respectively, such that the T-shaped pin 13 may be better guided, and the displacement of the T-shaped pin 13 in the left-and-right direction and in the front-and-rear direction may be reduced when in a clamping state, thus making the clamping more firm.

In the present disclosure, a clamping object 17, such as the body 3 in the prior art, is provided with a receiving groove 171 penetrating a bottom of the clamping object 17 in the front-and-rear direction, which is used for receiving the T-shaped pin 13. In which, the receiving groove has a T-shaped section, and includes a first groove and a second groove, a width of the first groove in the left-and-right direction is greater than a width of the second groove in the left-and-right direction. Particularly, a height of the first groove of the receiving groove 171 of the clamping object 17 in the up-and-down direction is slightly greater than a height of the protrusion part 132 of the T-shaped pin 13 in the up-and-down direction, such that the T-shaped pin 13 may conveniently slide in and out of the receiving groove 171.

In the present disclosure, the screw clamping lever 11 is connected to the housing 14 through thread, the T-shaped pin 13 passes through the circular hole 142 in the upper wall of the housing 14 and enters the circular groove 143 in the lower wall of the housing 14, the wedge 12 is disposed in the chamber 144 of the housing 14, a left end 1111 of the screw part 111 of the screw clamping lever 11 may selectively abut against the right end surface 123 of the wedge 12, and a left end surface 121 of the wedge 12 enters or passes through the groove 133 of the T-shaped pin 13. The inclined curved surface 122 of the wedge 12 faces downward, the lower wall surface 1331 of the groove 133 of the T-shaped pin 13 faces upward, such that the inclined curved surface 122 of the wedge 12 is arranged opposite to the lower wall surface 1331 of the groove 133 of the T-shaped pin 13.

In the present embodiment, the left end 1111 of the screw part 111 of the screw clamping lever 11 is configured to be a spherical surface, such that when the left end 1111 of the screw part 111 of the screw clamping lever 11 abuts against the right end surface 123 of the wedge 12, the contacting area between them may be reduced, thus facilitating the decrease of the wear and extending the service life of the clamping device 10. It should be understood that, the left end 1111 of the screw part 111 of the screw clamping lever 11 may also be configured to be other shapes, such as a plan.

A clamping process of the clamping device 10 for the microtome according to the embodiment of the present disclosure will be described below with reference to the accompanying drawings.

When the clamping object 17 needs to be clamped, the clamping object 17 is fitted over the T-shaped pin 13, the screw part 111 of the screw clamping lever 11 moves towards an interior of the housing 14 by rotating the lever part 112 of the screw clamping lever 11, the left end 1111 of the screw part 111 abuts against the right end surface 123 of the wedge 12 and push the wedge 12 to move to left; the inclined curved surface 122 of the wedge 12 is gradually engaged with the lower wall surface 1331 of the groove 133 of the T-shaped pin 13 and the horizontal curved surface 124 of the wedge 12 is gradually engaged with the inner surface of the chamber 144 of the housing 14, and the wedge 12 pull the T-shaped pin 13 downward through engaged inclined surfaces, such that a clamping force between a lower surface of the protrusion part 132 of the T-shaped pin 13 and a lower wall surface of the first groove of the receiving groove 171 of the clamping object 17 gradually increases, such that the clamping object 17 is pressed on an outer surface of the upper wall of the housing 14. In this case, the lever part 112 of the screw clamping lever 11 may be released, the clamping device 10 for the microtome according to the embodiment of the present disclosure has good self-locking effect due to the self-locking characters of the wedge structure and the threaded structure. It should be understood that the clamping device 10 according to the embodiment of the present disclosure is configured to be a pull-type clamping device.

In addition, a portion of the T-shaped pin 13 contacting the clamping object 17 will produce wear after a period of use, which may be compensated by increasing a length of the screw part 111 of the screw clamping lever 11 screwed into the housing 14. Therefore, the service life of the clamping device 10 according to the embodiment of the present disclosure may be extended.

In the present disclosure, the clamping device 10 for the microtome according to the embodiment of the present disclosure may also include a first spring 15 (as an example of the first elastic element), which is disposed in the housing 14 and located between the left end surface 121 of the wedge 12 and an left wall of the housing 14. In which, the first spring 15 has a certain amount of pre-compression, such that the wedge 12 may abut against the left end 1111 of the screw part 111 of the screw clamping lever 11 all the time.

A releasing process of the clamping device 10 for the microtome according to the embodiment of the present disclosure will be described below with reference to the accompanying drawings.

When the clamping object 17 needs to be released, the screw part 111 of the screw clamping lever 11 is moved towards an exterior of the housing by rotating the lever part 112 of the screw clamping lever 11, the wedge 12 overcomes the self-locking of the wedge structure and moves to the right under the action of the elastic restoring force of the first spring 15, the lower wall surface 1331 of the groove 133 of the T-shaped pin 13 is gradually disengaged with the inclined curved surface 122 of the wedge 12, such that the clamping force between the lower surface of the protrusion part 132 of the T-shaped pin 13 and the lower wall surface of the first groove of the receiving groove 171 of the clamping object 17 is gradually reduced until the clamping object 17 is released, and the clamping object 17 may easily be removed in the front-and-rear direction.

In the present embodiment, the clamping device 10 for the microtome according to the embodiment of the present disclosure may further include a second spring 16 (as an example of the second elastic element), which is disposed in the housing 14 and located between the lower end of the T-shaped pin 13 and the lower wall of the housing 14. In which, the second spring 16 has a certain amount of pre-compression, such that the lower wall surface 1331 of the groove 133 of the T-shaped pin 13 is engaged with the inclined curved surface 122 of the wedge 12 all the time and the horizontal curved surface 124 of the wedge 12 is engaged with the inner surface of the chamber 144 of the housing 14. Therefore, when the clamping object 17 is released and the T-shaped pin 13 is slid out of the receiving groove 171 of the clamping object 17, the T-shaped pin 13 is prevented from impacting on the wedge 12 entering the groove 133 of the T-shaped pin 13 under the action of the gravity thereof.

The clamping device 10 may be applied in the microtome 100, as shown in FIGS. 1 and 2, the body 3 has a receiving groove with a T-shaped section. Accordingly, the clamping device 10 according to the embodiment of the present disclosure may be disposed in the segmental curved member 5. The T-shaped pin 13 is slid into the receiving groove of the body 3, and the screw clamping lever 11 may be operated to make the T-shaped pin 13 clamp the body 3 on the segmental curved member 5 after the body 3 is laterally adjusted to a suitable position along the segmental curved member 5. Similarly, the base 1 has a receiving groove with a T-shaped section. Accordingly, the clamping device 10 according to the embodiment of the present disclosure may be disposed in the mounting seat 102. The T-shaped pin 13 is slid into the receiving groove of the base 1, the screw clamping lever 11 may be operated to make the T-shaped pin 13 clamp the base 1 on the mounting seat 102 after the whole knife holder 1 is adjusted to a suitable position, such that the clamping for the whole knife holder 101 is achieved.

For the clamping device 10 according to the embodiment of the present disclosure, by providing the wedge structure, the threaded structure, the lever structure, and so on, it has advantages of effortless operation, good self-locking performance and long service life.

The clamping device 20 for the microtome according to another embodiment of the present disclosure will be described below with reference to the accompanying drawings.

Figure 5:
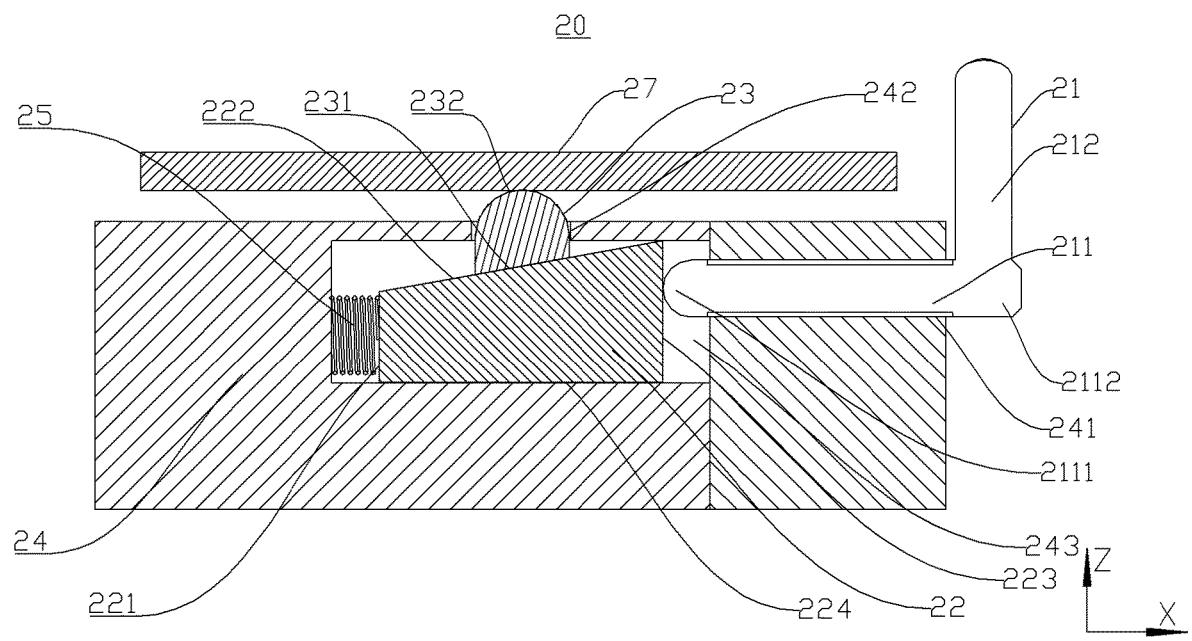
FIG. 5 shows a sectional view of a clamping device according to another embodiment of the present disclosure.
Figure 6:
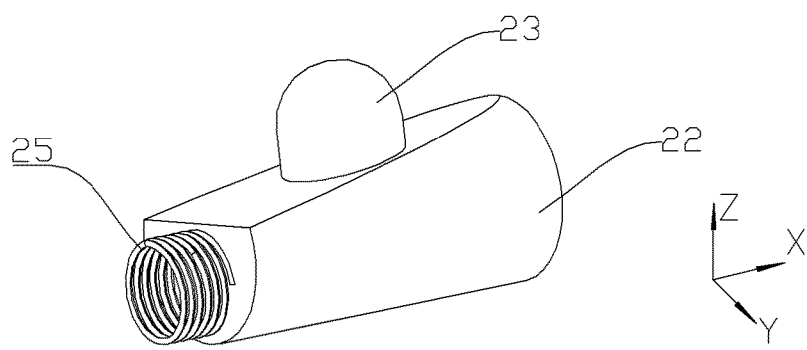
FIG. 6 shows a perspective view of a wedge, a cylindrical pin and a spring of a clamping device according to another embodiment of the present disclosure.

In the description of the clamping device 20, the description for the same part as the clamping device 10 is omitted for the purpose of simplifying. As shown in FIGS. 5 and 6, the clamping device 20 for the microtome according to the embodiment of the present disclosure includes a screw clamping lever 21 (as an example of the operating member), a wedge 22, a cylindrical pin 23 (as an example of the clamping member) and a housing 24. The clamping device 20 according to the embodiment of the present disclosure is different from the clamping device 10 according to the above embodiment of the present disclosure in that the wedge 22, the cylindrical pin 23 and the housing 24 have different structures.

In the present embodiment, the wedge 22 is configured as a chamfer cylinder, the wedge 22 includes a left end surface 221 and a right end surface 223 parallel to each other, an inclined plane 222 and a cylindrical surface 224. In which, the inclined plane 222 is tilted in the left-and-right direction, and the cylindrical surface 224 is horizontal in the left-and-right direction. That is to say, the inclined plane 222 of the wedge 22 is titled relative to the cylindrical surface 224 of the wedge 22, and the inclined plane 222 of the wedge 22 is tilted downward gradually from the right to the left relative to the cylindrical surface 224. The left end surface 221 and the right end surface 223 parallel to each other are each perpendicular to the cylindrical surface 224 of the wedge 22, and a height of the left end surface 221 in the up-and-down direction is less than that of the right end surface 123.

In the present embodiment, an upper end 232 of the cylindrical pin 23 is configured to be a spherical surface, and a lower end 231 thereof is configured to be an inclined plane. The spherical surface of the upper end 232 of the cylindrical pin 23 is adapted to abut against a lower surface of the clamping object 27 to press the clamping object 27. A tilt angle of the inclined plane of the lower end 231 of the cylindrical pin 23 relative to the horizontal plane is the same as a tilt angle of the inclined plane 222 of the wedge 22 relative to the cylindrical surface 224 of the wedge 22, and the inclined plane of the lower end 231 of the cylindrical pin 23 is gradually tilted downward from the right to the left.

In the present embodiment, the housing 24 is used to accommodate the screw clamping lever 21, the wedge 22 and the cylindrical pin 23. The housing 24 according to the embodiment of the present disclosure is different from the housing 14 according to the above embodiment in that a structure for mounting and guiding the cylindrical pin 23 is configured to be only a circular hole 242 formed in the housing 24, such that the housing 24 has a simplified structure.

In the present embodiment, for the clamping object 27, such as the pressure plate 4 in the prior art, there is no need for particular changes in structure.

In the present embodiment, a lever part 212 of the screw clamping lever 21 is integrally formed on a right end 2112 of a screw part 211 of the screw clamping lever 21 and is perpendicular to an axis of the screw part 211 of the screw clamping lever 21, the screw part 211 of the screw clamping lever 21 is screwed into a threaded hole 241 of the housing 24 through thread, the cylindrical pin 23 passes through the circular hole 242 in the upper wall of the housing 24, and the wedge 22 is disposed in a chamber 243 of a housing 24 and below the cylindrical pin 23. The left end 2111 of the screw part 211 of the screw clamping lever 21 may selectively abut against the right end surface 223 of the wedge 22. The inclined plane 222 of the wedge 22 faces upward, the inclined plane of cylindrical pin 23 faces downward, such that the inclined plane 222 of the wedge 22 is arranged opposite to the inclined plane of the cylindrical pin 23.

The clamping process of the clamping device 20 for the microtome according to the embodiment of the present disclosure is different from the clamping device 10 according to the above embodiment of the disclosure in that the wedge 22 pushes the cylindrical pin 23 upward through the engaged surfaces to produce the clamping force applied to the clamping object 27. It should be understood that the clamping device 20 according to the embodiment of the present disclosure is configured to be a push-type clamping device.

In the present embodiment, the clamping device 20 according to the embodiment of the present disclosure may further include a spring 25 (as an example of the first elastic element), which is disposed in the housing 24 and located between the left end surface 221 of the wedge 22 and an left wall of the housing 24. When releasing the clamping object 27, the wedge 22 overcomes the self-locking of the wedge structure and moves to the right under the action of the elastic restoring force of the spring 25, thus facilitating the release of the clamping object 27.

Figure 7:
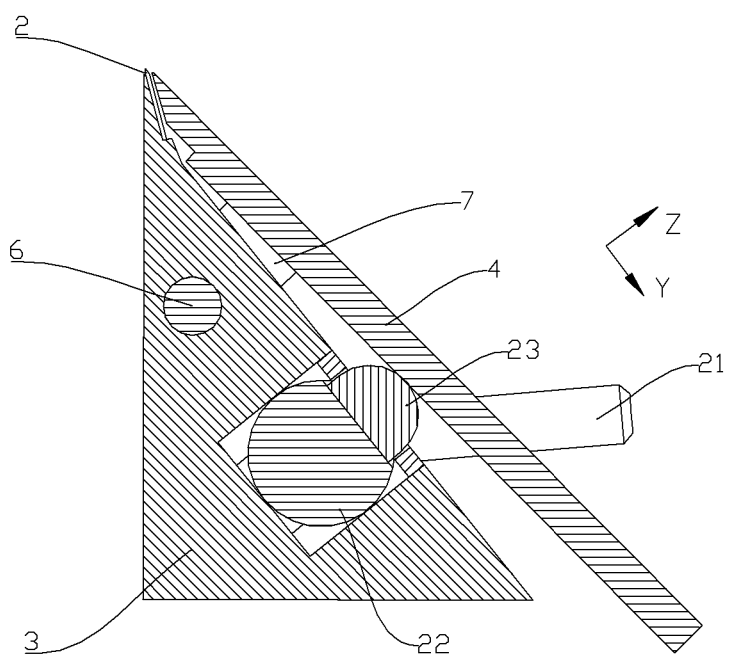
FIG. 7 shows a sectional view of a clamping device according to another embodiment of the present disclosure, which is used for clamping a microtome blade.

The clamping device 20 according to the embodiment of the present disclosure may be applied in the microtome 100, as an example shown in FIG. 7, the clamping device 20 according to the embodiment of the present disclosure is used to clamp the microtome blade 2. In which, the clamping device 20 is mounted in the body 3 (corresponding to the housing 24), the pressure plate 4 is fixedly connected to a shaft 6 extending in the left-and-right direction through a connecting part 7, and the shaft 6 is pivotally mounted in the body 3. Accordingly, the wedge 22 pushes the cylindrical pin 23 upward by rotating the lever part 212 of the screw clamping lever 21, the upper end of the cylindrical pin 23 abuts against the pressure plate 4, and pushes the pressure plate 4 to rotate about the shaft 6, such that a rear end of the pressure plate 4 presses the microtome blade 2 on the abutment surface of the body 3, and further the clamping for the microtome blade 2 is achieved.

For the clamping device 20 for microtome according to the embodiment of the present disclosure, by providing the wedge structure, the threaded structure, the lever structure, and so on, it has advantages of effortless operation, good self-locking performance and long service life, as well as a simple structure.

A microtome according to embodiments of the present disclosure is further provided, which includes a clamping device according to above embodiments of the present disclosure.

The microtome according to embodiments of the present disclosure have advantages of effortless operation, good self-locking performance and long service life, due to the provision of the clamping device according to the above embodiments of the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, the term "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A clamping device for a microtome, comprising:
an operating member;
a wedge having a first end, a second end and a first inclined surface located between the first end and the second end, the wedge being in the form of an expanded shape from the second end to the first end; wherein the wedge is configured as a truncated eccentric cone, and the first inclined surface of the wedge is configured as an inclined curved surface disposed facing downward in the second direction;
a clamping member having a second inclined surface, the first inclined surface and the second inclined surface being provided in a face-to-face arrangement and the first inclined surface being movable relative to the second inclined surface;
and a housing having a first guiding part, a second guiding part and a chamber, the first guiding part and the second guiding part being in communication with the chamber respectively, wherein the operating member is mounted in the first guiding part and the movement of the operating member is restricted to a first direction, the clamping member is mounted in the second guiding part and the movement of the clamping member is restricted to a second direction intersecting the first direction, and the wedge is disposed in the chamber;
wherein the operating member is operated to move towards the wedge in the first direction, such that the operating member contacts the first end of the wedge and pushes the wedge to move, and further the first inclined surface of the wedge contacts the second inclined surface of the clamping member and moves along the second inclined surface; whereby a pushing force of the operating member in the first direction is converted into a clamping force of the clamping member in the second direction.

2. The clamping device according to claim 1, wherein the operating member comprises a screw part with thread, the first guiding part is configured as a threaded hole extending in the first direction, and the screw part may be threaded into the threaded hole.

3. The clamping device according to claim 2, wherein the operating member comprises a lever part angularly and fixedly connected to an end of the screw part.

4. The clamping device according to claim 3, wherein the lever part and the operating member are integrally formed, and the lever part is perpendicular to an axis of the screw part.

5. The clamping device according to claim 2, wherein a portion of the screw part adjacent to the first end of the wedge forms a spherical surface.

6. The clamping device according to claim 1, further comprising: a first elastic element disposed between the second end of the wedge and a portion of the housing away from the first guiding part.

7. The clamping device according to claim 6, wherein the first elastic element is a spring.

8. The clamping device according to claim 1, wherein the chamber is configured as a cylindrical shape disposed in the first direction.

9. The clamping device according to claim 1, wherein the clamping member is configured as a T-shaped pin, the T-shaped pin has a groove adapted to receive the wedge, and the second inclined surface of the clamping member is configured as a inclined curved surface of the groove disposed facing upward in the second direction; the second guiding part is configured as a circular hole and a circular groove extending and coaxially disposed in the second direction.

10. The clamping device according to claim 9, wherein the circular hole is disposed in an upper portion of the housing in the second direction, and the circular groove is disposed in a lower portion of the housing in the second direction.

11. The clamping device according to claim 9, further comprising: a second elastic element disposed between a lower end of the T-shaped pin and the lower portion of the housing.

12. The clamping device according to claim 11, wherein the second elastic element is a spring.

13. The clamping device according to claim 1, wherein the wedge is configured as a chamfer cylinder, and the first inclined surface of the wedge is configured as an inclined plane disposed facing upward in the second direction.

14. The clamping device according to claim 13, wherein the clamping member is configured as a cylindrical pin, and the second inclined surface of the clamping member is configured as an inclined plane formed on a lower end of the cylindrical pin and disposed facing downward in the second direction; the second guiding part is configured as a circular hole extending in the second direction.

15. The clamping device according to claim 14, wherein the circular hole is disposed in an upper portion of the housing in the second direction.

16. The clamping device according to claim 14, wherein an upper end of the cylindrical pin forms a spherical surface.

17. A microtome, comprising:
a clamping device comprising:
an operating member,
a wedge having a first end, a second end and a first inclined surface located between the first end and the second end, the wedge being in the form of an expanded shape from the second end to the first end, wherein the wedge is configured as a truncated eccentric cone, and the first inclined surface of the wedge is configured as an inclined curved surface disposed facing downward in the second direction,
a clamping member having a second inclined surface, the first inclined surface and the second inclined surface being provided in a face-to-face arrangement and the first inclined surface being movable relative to the second inclined surface, and
a housing having a first guiding part, a second guiding part and a chamber, the first guiding part and the second guiding part being in communication with the chamber respectively, wherein the operating member is mounted in the first guiding part and the movement of the operating member is restricted to a first direction, the clamping member is mounted in the second guiding part and the movement of the clamping member is restricted to a second direction intersecting the first direction, and the wedge is disposed in the chamber, wherein the operating member is operated to move towards the wedge in the first direction, such that the operating member contacts the first end of the wedge and pushes the wedge to move, and further the first inclined surface of the wedge contacts the second inclined surface of the clamping member and moves along the second inclined surface; whereby a pushing force of the operating member in the first direction is converted into a clamping force of the clamping member in the second direction.

18. The clamping device according to claim 6, wherein the first elastic element has a certain amount of pre-compression, such that the wedge abuts against the operating member all the time.

19. The clamping device according to claim 9, wherein the T-shaped pin comprises a base part and a protrusion part connected to an upper end of the base part, the protrusion part protrudes from the base part in a radial direction, and the groove is formed in the base part and penetrates both sides of the base part in the first direction.

* * * * *